United States Patent
Enting et al.

[11] Patent Number: 5,923,750
[45] Date of Patent: Jul. 13, 1999

[54] TELEPHONE HANDSET

[75] Inventors: Albert Enting; Erik Johannes Maria Goldbach, both of Denekamp; Paul Johannes Catijn, Enschede, all of Netherlands

[73] Assignee: Telefonaktienbolaget LM Ericsson, Stockholm, Sweden

[21] Appl. No.: 08/602,740
[22] PCT Filed: Aug. 18, 1994
[86] PCT No.: PCT/NL94/00196
  § 371 Date: May 8, 1996
  § 102(e) Date: May 8, 1996
[87] PCT Pub. No.: WO95/05715
  PCT Pub. Date: Feb. 23, 1995

[30] Foreign Application Priority Data

Aug. 18, 1993 [EP] European Pat. Off. .............. 93202427
Nov. 26, 1993 [NL] Netherlands ............................ 9302057

[51] Int. Cl.⁶ .................................................... H04M 1/00
[52] U.S. Cl. .......................... 379/428; 379/433; 379/434; 455/90
[58] Field of Search ..................... 379/433, 434, 379/428, 61; 455/90, 89, 403; D14/248, 240, 138

[56] References Cited

U.S. PATENT DOCUMENTS

| 4,163,875 | 8/1979 | Cogan | 379/433 |
| 4,319,095 | 3/1982 | Cogan | 379/433 |
| 4,672,666 | 6/1987 | Kuhfus | 379/433 |
| 4,675,903 | 6/1987 | Gulezian et al. | 379/433 |
| 4,984,268 | 1/1991 | Brown et al. | 379/433 |
| 5,081,674 | 1/1992 | Wijas et al. | 379/433 |
| 5,201,069 | 4/1993 | Barabolak | 455/90 |
| 5,533,099 | 7/1996 | Byrne | 455/403 |

FOREIGN PATENT DOCUMENTS

| 371-708-A | 6/1990 | Australia . |
| 0 453 061 | 10/1991 | European Pat. Off. . |
| 35 16 290 | 11/1986 | Germany . |
| 35 38 054 | 4/1987 | Germany . |
| 36 09 490 | 9/1987 | Germany . |
| 91 15 132 | 2/1992 | Germany . |
| 2 225 192 | 5/1990 | United Kingdom . |

Primary Examiner—Wellington Chin
Assistant Examiner—Keith Ferguson
Attorney, Agent, or Firm—Burns, Doane, Swecker & Mathis, L.L.P.

[57] ABSTRACT

In a telephone handset having an elongate housing which defines a cavity, wherein a microphone and a loudspeaker are arranged, the microphone is arranged air-tightly in a chamber of the housing by a flexible gasket. A portion of the gasket extends at least partially over the rear part of the microphone. In order to hold the microphone and the gasket under weak pressure and vibration-free in the chamber, a separate plate engages this portion. A printed circuit board arranged in the cavity can be used for this purpose. The loudspeaker can be mounted in a corresponding manner.

16 Claims, 4 Drawing Sheets

TELEPHONE HANDSET

TECHNICAL FIELD OF THE INVENTION

The invention relates to a telephone handset of the type for use in combination with a telephone apparatus containing the electrical and electronic components necessary for the functioning of the assembly. The invention also relates to a telephone handset of the integrated type wherein the telephone handset and the associated electrical and electronic components are accommodated as a unit in one housing. The invention relates particularly to a telephone handset of the integrated type for use as portable, hand-held, cordless telephone.

BACKGROUND OF THE INVENTION

A telephone handset typically comprises an elongate housing which defines a cavity in which a first converter such as a microphone is arranged at one end for converting received acoustic signals into an electrical signal and wherein a second converter such as a loudspeaker or telephone is arranged at another end for converting received electrical signals into an audible acoustic signal. For the sake of simplicity the respective terms microphone and loudspeaker are used in the following, without the intention of limitation, to designate the said converters.

In a telephone handset of the type for use in combination with a telephone apparatus, in general only connecting wires extend from the one to the other end in the said cavity. In a telephone handset of the integrated type the electrical and electronic components necessary for functioning are also accommodated in said cavity. In the English-language professional literature both types are called a "handset".

Particularly the above mentioned portable, cordless telephone handsets with built-in transmitting and receiving facilities have in the course of time become more compact and convenient to handle in terms of size as a result of a far-reaching miniaturization and/or integration of the electrical and electronic components. The distance between the microphone and the loudspeaker has hereby become smaller, wherein comparatively more sensitive microphones are also employed for adequate reception of speech sound etc.

This has the drawback however that the microphone also more easily picks up noise and vibrations generated by the loudspeaker. As a consequence of delays in the speech transfer the person being spoken to at the remote end during a telephone conversation will hereby have relayed back to him his own delayed voice sound, which manifests itself as an intrusive echo.

It has been found that an echo of the same level becomes the more disturbing as the delay time increases. This problem will for instance occur in transmission paths running via communication satellites, but in particular also in so-called TDMA/TDD (Time Division Multiple Access/Time Division Duplex) communication systems, for instance digital cordless communications equipment operating in accordance with the DECT standard (Digital European Cordless Telecommunications).

Use is made herein of a number of speech channels arranged in time sequence (TDMA). A first half of this number of channels is used for communication in the one direction while a second half is used for communication in the other direction (TDD). This causes an additional delay compared for instance with systems having communication channels continuously available for each direction. Particularly in the case of telephone handsets for use in such systems this additional delay imposes requirements as to the maximum permissible sound and vibration transfer or cross-talk between the loudspeaker and the microphone.

Different cross-talk paths between the microphone and the loudspeaker of a telephone handset can be distinguished: an external acoustic path through the air outside the telephone handset, an internal acoustic path via the cavity in the housing of the telephone handset and a number of mechanical vibration paths, wherein the vibrations generated by the loudspeaker are transferred mechanically via the housing, via the electrical and electronic components, via the wiring etc. to the microphone. Cross-talk can also occur electrically.

In the English-language professional literature the above described forms of cross-talk are known under the concept of "Telephone Coupling Loss (TCL)". Individual TCL values, laid down in standard specifications, apply for the different transmission systems.

From DE-A1-35 16 290 is known a telephone handset of the type for use with a telephone apparatus. The grip of the handset is provided with a cover which damps mechanical vibrations. The mechanical vibration decoupling between the loudspeaker and the microphone is however far from optimal because the shells encasing the microphone and the loudspeaker are coupled via mechanical snap-in connections to a mechanically rigid carrier and the microphone and the loudspeaker make direct mechanical contact with the shells. This telephone receiver does not have an internal connecting cavity between the microphone and the loudspeaker.

EP-A-0,166,198 likewise relates to a telephone handset for use in combination with a telephone apparatus. The loudspeaker and microphone are mounted in the housing via elastic sealing rings in order to prevent acoustic cross-talk via the cavity of the housing. In order to hold the microphone and loudspeaker firmly in position the housing is provided with various resilient fingers and cams. Steps which make no contribution whatever toward reducing the mechanical vibration transfer between loudspeaker and microphone.

EP-A-0,453,061 relates to a telephone handset of the integrated type wherein the microphone, loudspeaker and the several electrical and electronic components are arranged in a cavity inside a single housing. In order to improve the mechanical decoupling the microphone is mounted in a cylindrical chamber of the housing via a so-called "acoustic insulator". This acoustic insulator consists fundamentally of a compressible gasket with a first portion provided with a larger opening for receiving the microphone and a narrower second portion which extends mutually in line with the first portion and can protrude outside the housing of the telephone handset.

The insulator has to engage in firmly clamping manner on the microphone and the wall of the chamber to prevent the insulator and the microphone coming out of the chamber as a result of shocks or impacts. This requirement imposes limitations on the choice of material for the insulator. Furthermore, the insulator is hereby subjected continually to a considerable mechanical stress, which in the long term has an adverse effect on the clamping action of the material. The danger of undesired movement of the microphone in relation to the chamber is hereby increased, as is the danger of the occurrence of undesired acoustic leakage paths via the cavity in the housing.

GB-A-2,225,192 discloses a telephone handset of the type for use with a telephone apparatus, wherein the microphone and loudspeaker are likewise mounted in firmly clamping manner in respective chambers of the housing by means of elastic gaskets. The drawbacks of a limited material choice and a continuous, comparatively high mechanical stress in the gaskets as discussed above also apply here.

SUMMARY OF THE INVENTION

The basic objective of the invention is generally to provide a telephone handset with which the applicable TCL requirements can be met at least during the predicted useful life and with an as constant as possible speech transmission quality. In particular a telephone handset for use in communication systems with an additional delay in the speech transmission, including TDMA/TDD systems.

The invention also has for its object to achieve an acceptable, constant quality in the speech transmission path, particularly in respect of the microphone part.

The invention is based in the first instance on the insight that a degree of internal acoustic and mechanical cross-talk damping between the microphone and loudspeaker parts of the telephone handset that is adequate for many applications can be achieved by suspending or fixing the microphone part in a mechanically flexible and air-tight manner in the housing of the telephone handset. For an advanced degree of damping the loudspeaker part is also mounted in mechanically flexible and air-tight manner in the housing.

Air-tight means in this context preventing a direct air path between the acoustically active outward facing front part of the microphone and/or the loudspeaker and the internal cavity of the housing of the telephone handset.

In a first embodiment the invention provides a telephone handset comprising an elongate housing which defines a cavity, wherein a microphone is disposed close to one end of the housing and a loudspeaker close to another end of the housing. The microphone and the loudspeaker each have an acoustically active front part and an acoustically inactive rear part and a peripheral wall extending therebetween. At least the microphone is arranged sealingly in a chamber of the housing by means of an elastic gasket engaging on its periphery such that the transmission of sound from the cavity through the chamber to the front part of the microphone is blocked. In accordance with the inventive concept the gasket is manufactured from a relatively flexible material with a portion extending at least partially over the rear part of the microphone. To hold the gasket and the microphone in the chamber means are provided which engage on this portion of the gasket.

Instead of a rigid gasket engaging with a comparatively high friction force on the wall of the chamber and the shell of the microphone as according to the cited EP-A-0,453,061 and GB-A-2,225,192, the invention makes use of a relatively flexible gasket. By herein causing the means for holding the microphone in the chamber to engage on the gasket part on the rear side of the microphone, an overall improved damping against transfer of mechanical vibrations generated by the loudspeaker is obtained.

The choice of material for the gasket according to the invention can to a large extent be geared entirely to achieving air-tightness, without additional requirements being made of the clamping or friction force for fixing the microphone in the chamber for the predicted useful life of the telephone handset.

In a further embodiment of the invention the portion of the gasket extending on the rear part of the microphone and the holding means are dimensioned such that a relatively weak continuous pressure is exerted on the gasket and the microphone in the direction to the active front part thereof. Hereby is achieved that the front part of the microphone can be held close-fittingly against the adjacent wall of the chamber without interspacing so that a column of air does not occur on the front part of the microphone. For this reason the gasket does not extend in this embodiment over the front part of the microphone or a portion thereof.

It is noted that in the said EP-A-0,453,061 and GB-A-2,225,192 the microphone can be moved in axial direction of the chamber by shocks and/or impacts, with the danger of the occurrence of an undesired column of air. It can otherwise be seen from the construction of the shown gaskets that minimalizing of a column of air on the front part of the microphone has not been taken into account at all.

This is therefore important, because such a column of air can vibrate and resonate via the vibrations generated by the loudspeaker, which once again forms an undesired acoustic coupling with the microphone. In an embodiment of the invention for use with a separate cover plate for the housing, the chamber protrudes some distance outside the housing. The cover plate can hereby be mounted in direct air-tight connection to the chamber without air column or other interspace, for instance by glueing or ultrasonic welding.

Due to the use of a flexible gasket only a relatively weak mechanical bias is necessary, which has no noticeable adverse effect on the mechanical properties of the gasket, at any rate for the predicted useful life of the telephone handset.

In the preferred embodiment of the invention a relatively thin, open material absorbing mechanical vibrations is arranged between the active front part of the microphone and the opposite side of the chamber. Conceivable here is open woven material or an open non-woven material with good mechanical vibration-absorbing properties. An adequate vibration insulation is obtained in this way between the front part of the microphone and the associated wall of the chamber.

In yet another embodiment of the invention the loudspeaker is also arranged air-tightly in a further chamber of the housing by means of an elastic gasket engaging on its periphery and at least partially on its front and rear part such that the transfer of sound from the cavity through this chamber to the front part of the loudspeaker is blocked. In accordance with the inventive concept the gasket is of a relatively flexible material and means engage on the portion of the gasket located on the rear part to hold the gasket and loudspeaker in the further chamber.

The holding means can take different forms, among which a separate plate part which is fixed, for instance glued or ultrasonically welded, to the chamber, a plate for arranging in a recess of the chamber or, for instance, ribs or cams formed fixedly in the chamber.

In a preferred embodiment of the invention, in particular for a telephone handset of the integrated type, the holding means are formed by a printed circuit board on which are mounted the several electrical and electronic components.

The gasket does not necessarily have to consist of an integral unit. In yet a further embodiment of the invention the part of the gasket engaging on the rear part of the microphone respectively the loudspeaker is formed wholly or partially by an elastic, electrically conducting material. The electrical connection between for example the printed circuit board and the microphone and/or loudspeaker can be directly effected herewith.

In order to bring about a desired abssorption and/or compression action or elasticity for a flexible suspension of the microphone and/or loudspeaker in the associated chambers, the gaskets can be provided on their outer periphery with teeth or ribs and the like in addition to recesses. This is because in the invention the relevant gaskets do not fulfil any fixation function for the relevant component. In particular the gaskets are formed outwardly tapering on at least one peripheral edge in the direction transversely of the front part and/or rear part of the microphone or loudspeaker. This to obtain desired compression properties in the direction of the front part of the microphone or the loudspeaker. The gaskets can consist of an integral unit or separate parts.

The invention is elucidated hereinbelow with reference to an application in a telephone handset of the integrated type as illustrated in the annexed drawings.

DETAILED DESCRIPTION OF EMBODIMENTS

Figure 1:
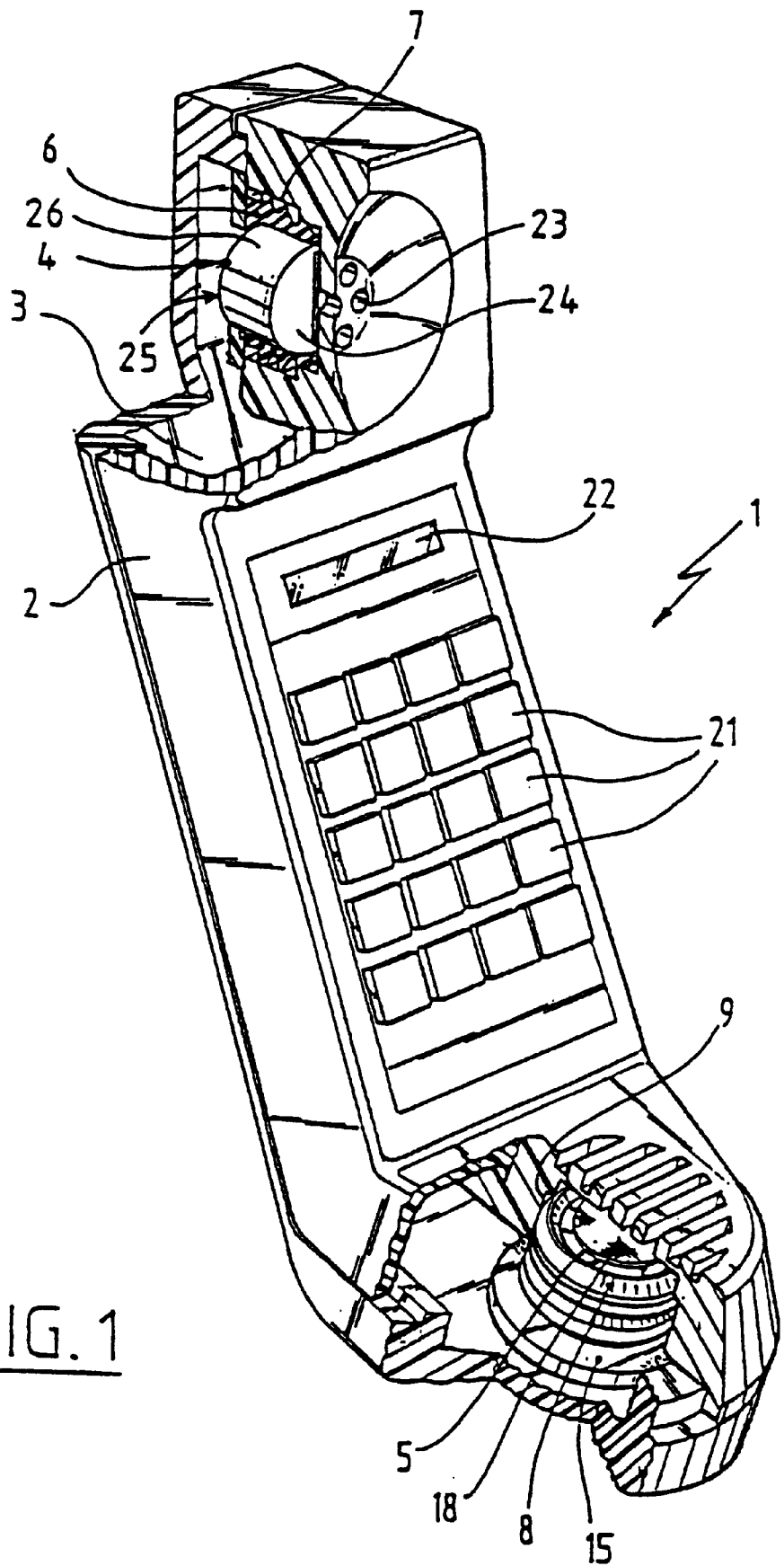
FIG. 1 shows a schematic, perspective partly broken away view of a telephone handset according to the invention.

FIG. 1 shows a telephone handset 1 of the integrated type comprising an elongate plastic housing 2 which consists of a number of mutually coupled plastic parts and which defines an internal cavity 3. In the cavity 3 a loudspeaker 4 is received close to an end of the housing 2 and a microphone 5 close to another end of the housing 2. The telephone handset further contains a front panel with control keys 21 and a display unit 22, for instance a Liquid Crystal Display (LCD) unit.

The loudspeaker 4 has an acoustically active front part 24 for generating sound signals, in particular speech, an acoustically inactive rear part 25 and a cylindrical peripheral wall 26. Loudspeaker 4 is suspended in a rotation symmetrical, profiled elastic gasket or ring 6. Via this gasket 6 the loudspeaker 4 fits in an air-tight manner in a recess or chamber 7 of housing 2.

The chamber 7 has a first open outer end which debouches in the cavity 3 and a second outer end which is provided with one or more apertures 23 for transmitting to the locality outside housing 2 the acoustic signals generated by loudspeaker 4. Air-tight signifies in this context that there is no air path via the chamber 7 from the first outer end in the cavity 3 to the acoustically active front part 24 of loudspeaker 4 adjacent the aperture(s) 23.

The microphone 5 has an acoustically active front part 27 for receiving sound signals, in particular speech, an acoustically inactive rear part 28 and a likewise cylindrical peripheral wall 29. Microphone 5 is received in similar manner to the loudspeaker 4 in a rotation symmetrical, profiled elastic gasket or ring 8. Via this gasket 8 the microphone 5 fits in an air-tight manner into a corresponding recess or chamber 9 of housing 2.

The chamber 9 has a first open outer end which debouches in the cavity 3 and a second outer end which is provided with one or more apertures 19 for receiving sound from the locality outside housing 2. Air-tight signifies in this context that there is no air path via the chamber 9 from the first outer end in cavity 3 to the acoustically active front part 27 of microphone 5 adjacent the aperture(s) 19.

The gaskets 6 and 8 effectively prevent sound generated by the loudspeaker 4 from passing via chamber 7 through the cavity 3 and then via the chamber 9 to the active front part 27 of the microphone. In the simplest embodiment a gasket 8 for only the microphone 5 can suffice.

Figure 2:
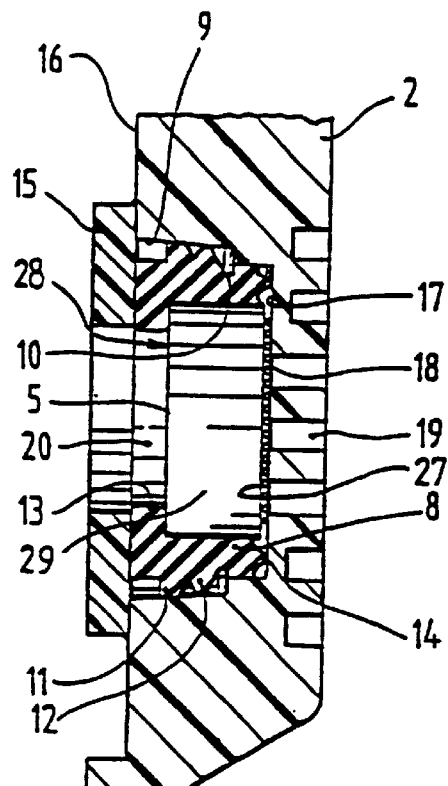
FIG. 2 shows schematically a cross section through the microphone part of the telephone handset according to FIG. 1.

FIG. 2 shows in cross section the microphone part of the telephone handset 1 according to FIG. 1. The gasket 8 has a cylindrical jacket 10 which is adapted to the form and dimensions of the peripheral wall 29 of microphone 5 and which has two ribs 11, 12 extending radially outward on the outer periphery of the jacket 10 and a flanged edge 13 extending partially over the rear part 28 of microphone 5. The peripheral edge 14 of gasket 8 which adjoins the front side 27 of microphone 5 is formed outwardly tapering in axial direction transversely of the front side 27. This peripheral edge 14 does not extend over the front part 27 of the microphone. It will be apparent that the microphone 5 is arranged "suspended" in the gasket 8.

The gasket 8 and microphone 5 are held in the chamber 9 by means of an annular plastic plate 15 which engages on the flanged edge 13. The plate 15 partially closes the chamber 9 on the end thereof facing toward cavity 3 and is fixedly mounted in appropriate manner to the relevant inner surface 16 of housing 2 by means of glueing, ultrasonic welding and the like. The through opening 20 on the rear of microphone 5 serves for passage of connecting wires for microphone 5.

A thin open cloth 18 of woven material or a non-woven material is arranged between the front part 27 of microphone 5 and the opposite wall 17 of chamber 9 for the purpose of damping mechanical vibrations. The cloth 18 is preferably as thin as possible. Practical thicknesses lie in the order of magnitude of 0.1–0.3 mm. The gasket 8 can essentially be of any flexible elastic material. Particularly Suitable are silicone rubbers.

The gasket 8 is dimensioned with respect to the chamber 9, microphone 5 and plate 15 such that a continuous weak axial pressure is exerted on the gasket 8 and via this latter on the microphone 5 in the direction of the front part 27 of microphone 5 and in radial direction via the jacket or peripheral wall 10 on chamber 9. This provides the desired air-tightness and effectively prevents the occurrence of an undesired column of air between the front part 27 and the adjacent wall 17 of chamber 9. Because only a comparatively weak pressure or bias is necessary on account of the use of a flexible gasket, the mechanical properties of the gasket will not noticeably change, at least for the predicted useful life of the telephone handset. This also means that the original speech transfer quality of the telephone handset will also not noticeably change and there will be sustained compliance with the applicable TCL standard in accordance with the object of the invention.

The loudspeaker 4 is accommodated in the housing 2 in similar manner to the microphone 5. It is not therefore necessary to discuss this construction in detail again. However, in the case of the loudspeaker, the gasket can extend partially over the front part of the loudspeaker. It is noted that this air-tight and mechanical vibration-damping method of mounting the loudspeaker 4 is not always necessary, this dependent inter alia on the applicable TCL standard. A mechanical vibration-damping method of mounting is however generally necessary. This is to prevent loudspeaker 4 generating mechanical vibrations to the housing 2 which are converted by the microphone 5 into electrical signals. This applies particularly in the case of constructions where no cloth 18 is used, such as shown for instance in FIG. 3.

Figure 3:
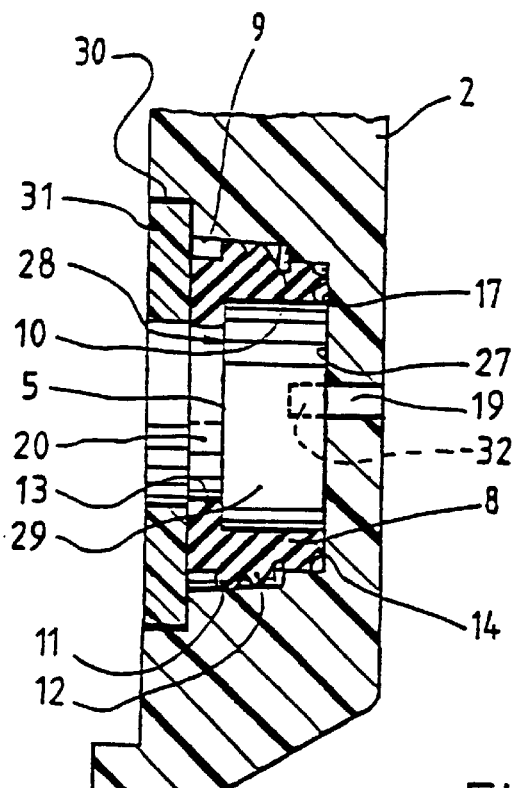
FIG. 3 shows a cross section similar to FIG. 2 of a further telephone handset according to the invention.

FIG. 3 shows an embodiment of the microphone suspension corresponding with FIG. 2, wherein however the chamber 9 is provided on its peripheral wall 10 with a recess 30, in which engages an annular plastic plate 31 having the same purpose as plate 15 in FIG. 2. The wall 17 of chamber 9 located opposite the front part 27 of microphone 5 has only one aperture 19 to the outside which connects precisely without interspacing onto a pick-up opening 32 of microphone 5 designated with dashed lines.

With such a precise fitting a cloth 18 is not always needed to prevent a column of air between the front part 27 of microphone 5 and the wall 17 of the recess, provided that the loudspeaker 4 is mounted in sufficiently vibration-free manner in the housing 2. Plate 31 is once again mounted fixedly in recess 30 by glueing, welding and the like.

Connecting means for the microphone and the loudspeaker are not shown in the figures. These usually consist of wires, resilient contacts or other connecting provisions per se known in practice.

Instead of a separate plate for holding the microphone in the chamber use can also advantageously be made for this purpose, particularly in telephone handsets of the integrated type, of the printed circuit board present therein, on which the several electrical and electronic circuit components are mounted.

Figure 4:
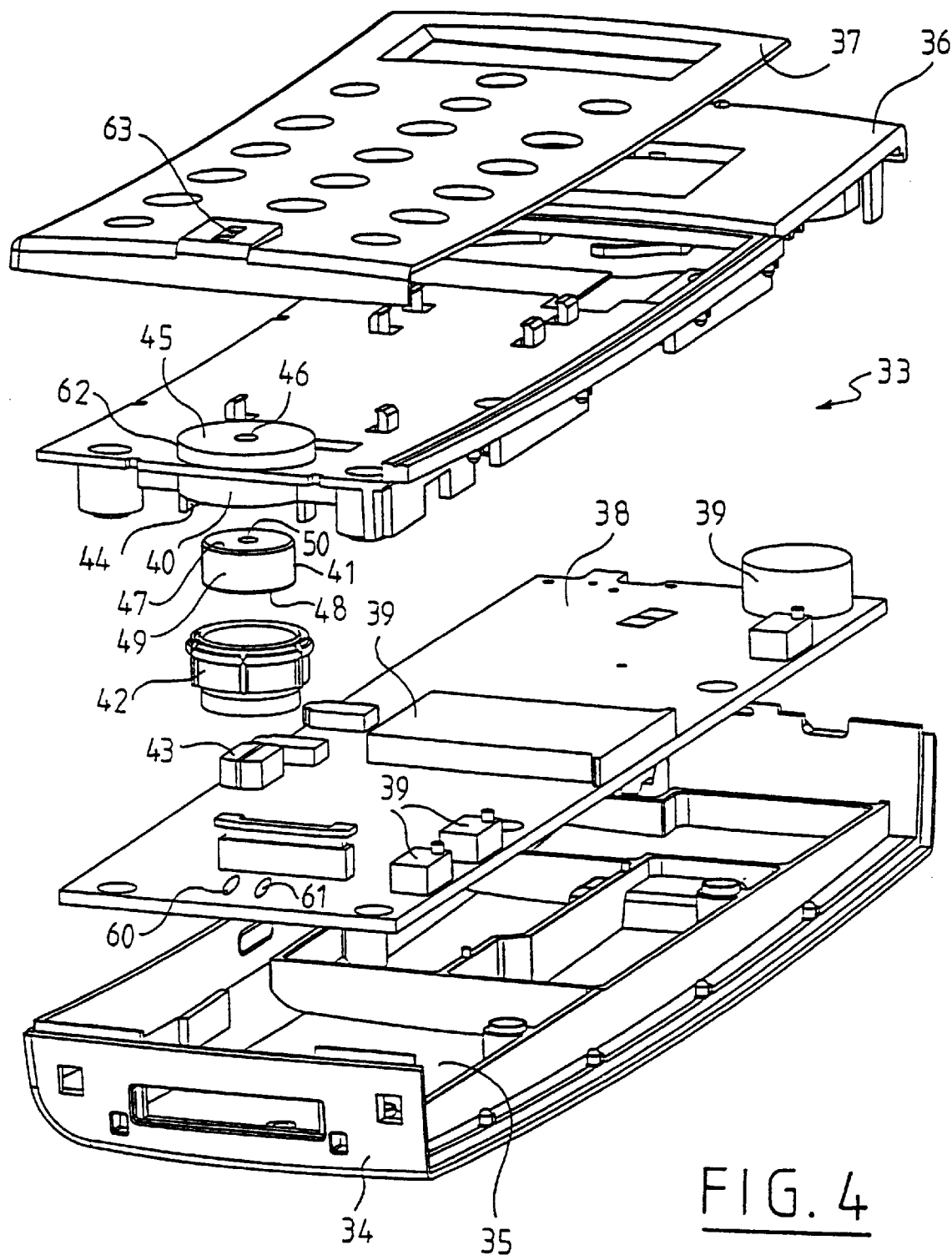
FIG. 4 shows a schematic, perspective view with exploded parts of yet a further telephone handset according to the invention.

FIG. 4 shows an embodiment of a telephone handset 33 of the integrated type according to the invention for use as cordless portable, hand-held telephone. The telephone handset 33 comprises a plastic housing consisting of a box 34 which generally bounds a cavity 35 onto which fits a cover 36 for mounting inter alia control keys and a display unit as shown for instance in FIG. 1. A cover plate 37 enclosing the control keys and the display unit is arranged on cover 36. Such a cover plate 37 is also referred to in the English-language professional literature as a "cosmetic cover". Further shown is a printed circuit board 38 on one or both sides of which several electrical and electronic circuit components 39 are mounted, including transmitting and receiving means.

The cover 36 contains a chamber 40 for receiving a microphone 41 and a gasket consisting of two parts 42, 43. Chamber 40 has a cylindrical form adapted to the microphone 41 with a peripheral wall 44 and a bottom 45 in which is situated an aperture 46. Microphone 41 has an acoustically active front part 47, an acoustically inactive rear part 48 and a peripheral wall 49 extending therebetween. Located in the front part is an aperture 50 for receiving the sound for converting.

Figure 5:
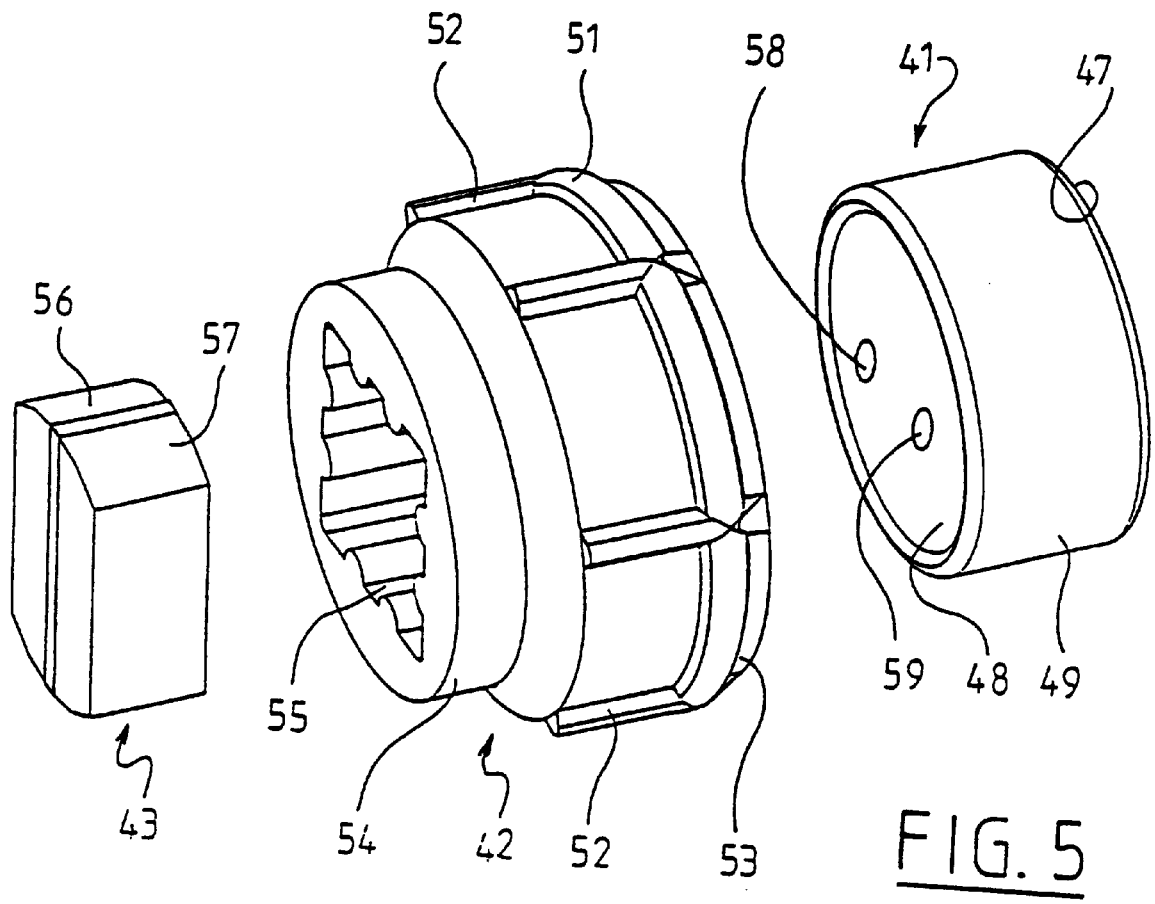
FIG. 5 shows schematically in perspective and on enlarged scale the several gasket parts and the microphone of the telephone handset according to FIG. 4.

The form of the gasket is shown more clearly in FIG. 5. The first gasket part 42 has in a manner similar to the gasket 8 of FIG. 2 several radially outward protruding ribs 51, 52 and a tapering peripheral edge 53 which in the mounted situation adjoins the front part 47 of microphone 41 but which does not extend over the surface of the front part 47. Formed on the end located opposite the peripheral edge 53 is a collar 54 with an adapted opening 55 for receiving therein a second gasket part 43.

Figure 6:
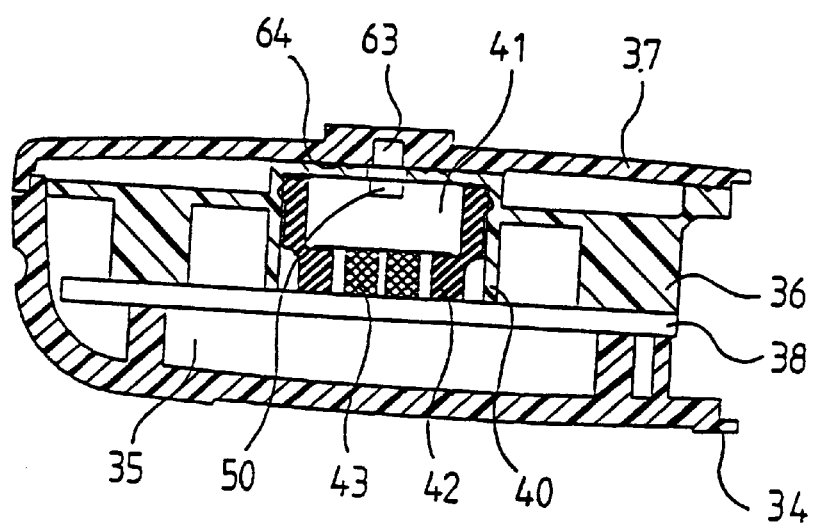
FIG. 6 shows schematically on enlarged scale a cross section transversely through the mounted microphone part of the telephone handset according to FIG. 4.

In the assembled state as shown in cross section in FIG. 6, the printed circuit board 38 engages on the collar 54 of the first gasket part 42 and on the second gasket part 43. In this way the first gasket part 42 is held in the chamber 40 under weak pressure in axial and radial direction. Via the second gasket part 43 the microphone 41 is held sufficiently firmly against the wall 45 of chamber 40 in order to prevent an undesired air column on the front part 47 of microphone 41.

In accordance with the inventive concept both gasket parts 42, 43 are once again of flexible elastic material, as discussed in the foregoing with respect to the gasket 8. In the embodiment shown the second gasket part 43 consists of elastic, electrically conducting material comprising two electrically conducting halves 56, 57 which are mutually insulated. The English-language professional literature also refers in this context to "elastomeric connectors".

In the assembled state of the telephone handset 33 the said halves make electrical contact on one side with terminal patches 60, 61 on the printed circuit board 38 and on the other side with terminal patches 58, 59 on the rear part 48 of microphone 41. In this way the microphone 41 is electrically contacted. Although not shown, it will be apparent that a loudspeaker can also be mounted and electrically connected in this manner.

Because the front part 47 of microphone 41 connects close-fittingly in chamber 40 onto the wall 45 thereof and because the apertures 46 and 50 are precisely aligned, no cloth 18 or the like is necessary when the loudspeaker is mounted in sufficiently vibration-absorbing manner. In order to prevent a possible acoustic transfer path from the loudspeaker to the microphone in the space beneath the cover plate 37 the chamber 40 protrudes with its wall 45 a distance 62 above the surface of the cover 36. This distance is such that the cover plate 37 with its microphone aperture 63 aligned with aperture 46 in the cover 36 can be fixedly mounted to the wall 45 on the outside of the chamber 40, for instance by glueing or preferably by means of ultrasonic welding as designated with the reference numeral 64.

The invention is not of course limited to the illustrated circular-cylindrical microphones, loudspeakers and chambers with correspondingly formed gaskets. As required, for example in order to achieve a desired compressibility, the gaskets can within the inventive concept be provided with more or fewer ribs or additional recesses and the like. Subject to a desired contacting, a coaxially embodied elastomeric connector can for instance also be applied.

We claim:

1. A telephone handset comprising:

an elongate housing which defines a cavity;

a chamber located in said housing at one end thereof;

a microphone disposed in said chamber, said microphone including a front part having a front surface at least a portion of which is acoustically active for picking up acoustic signals and an inactive rear part connected by a peripheral surface;

a loudspeaker close to another end of said housing, and a gasket of flexible material engaging said peripheral surface to seal said microphone in said chamber and block transfer of sound from said cavity through said chamber to said microphone front part, wherein no gasket extends over said microphone front part and at least said acoustically active portion of said microphone front part is held in a close-fit mounting against said chamber.

2. Telephone handset according to claim 1, wherein a thin, open material absorbing mechanical vibrations is arranged between the front part of the microphone and an adjoining side of the chamber.

3. Telephone handset according to claim 1, wherein the chamber for receiving the microphone protrudes on the active front part hereof some distance outside the housing for connection hereto of a cover plate for the housing.

4. Telephone handset according to claim 1 wherein the loudspeaker is arranged air-tightly in a further chamber of the housing by means of another elastic gasket engaging on its periphery sealing the loudspeaker in the chamber blocking the transfer of sound from the cavity through said further chamber to the front part of the loudspeaker, and the other gasket is of a flexible material, with means engaging on a portion of the other gasket located on the rear part of the loudspeaker for holding the other gasket and the loudspeaker in the further chamber.

5. Telephone handset according to claim 1, wherein the gasket is formed tapering on at least one peripheral edge in a direction transversely of the front part of the microphone.

6. Telephone handset according to claim 5, wherein a part of the gasket engages on the rear part of the microphone and consists at least partially of elastic, electrically conducting material.

7. Telephone handset according to claim 1, wherein a portion of the gasket extends on the rear part of the microphone and a holding means are dimensioned to provide a weak continuous pressure on the gasket and the microphone in the direction towards the front part thereof.

8. Telephone handset according to claim 1, further comprising a plate part engaging a portion of said gasket and at least partially closing the chamber.

9. Telephone handset according to claim 8, wherein the plate part is a printed circuit board arranged in the cavity of the housing.

10. Telephone handset according to claim 1, further comprising transmitting and receiving means for use as a portable cordless telephone, in particular for use in digital Time Division Multiple Access/Time Division Duplex (TDMA/TDD) systems.

11. A telephone handset comprising:
an elongated housing which defines a cavity;
a chamber located in said housing at one end thereof; including a substantial flat front part having an acoustically active part for picking up acoustic signals and an inactive rear part connected by a peripheral surface;
a loudspeaker close to another end of said housing, and
a gasket of flexible material engaging said peripheral surface to seal said microphone in said chamber and block transfer of sound from said cavity through said chamber to said microphone front part, wherein said microphone front part is flush with said housing along said front part and wherein a portion of the gasket engages the rear part of the microphone is at least partially elastic, electrically conducting material.

12. A telephone handset according to claim 1, wherein the gasket is formed tapering on at least one peripheral edge in a direction transversely to the front part of the microphone.

13. A telephone handset according to claim 11, wherein a portion of the gasket extends over the rear part of the microphone and a means for holding the gasket engaging a portion of the gasket are dimensioned to provide a weak continuous pressure exerted on the gasket and the microphone in the direction towards the front part thereof.

14. A telephone handset according to claim 11, further comprising a plate part engaging a portion of said gasket and at least partially closing the chamber.

15. A telephone handset according to claim 14, wherein the plate part is a printed circuit board arranged in the cavity of the housing.

16. A telephone handset according to claim 11, further comprising transmitting and receiving means for use as a portable cordless telephone, in particular for use in digital Time Division Multiple Access/Time Division Duplex (TDMA/TDD) systems.

* * * * *